United States Patent [19]

Freund

[11] Patent Number: 4,685,945

[45] Date of Patent: Aug. 11, 1987

[54] METHOD OF PROCESSING HIGH PURITY LOW-OH VITREOUS SILICA FIBERS

[76] Inventor: Friedemann Freund, 225 Sussex St., San Francisco, Calif. 94131

[21] Appl. No.: 854,121

[22] Filed: Apr. 21, 1986

Related U.S. Application Data

[63] Continuation-in-part of Ser. No. 577,270, Feb. 6, 1984, abandoned.

[51] Int. Cl.$^4$ ............................................. C03B 37/01
[52] U.S. Cl. ......................................... 65/4.21; 65/2; 65/30.1; 65/4.3
[58] Field of Search ...................... 65/3.12, 2, 4.1, 4.3, 65/4.2, 3.11, 30.1, 4.21, 30.13

[56] References Cited

U.S. PATENT DOCUMENTS 4,389,230  6/1983  Modone et al. ...................... 65/3.12
4,515,612  5/1985  Burrus .............................. 65/30.1 X

FOREIGN PATENT DOCUMENTS 68388    1/1983  European Pat. Off. ............. 65/3.14
3104041  8/1982  Fed. Rep. of Germany ............ 65/2

OTHER PUBLICATIONS

J. E. Shelby et al.; J. Applied Phys. 50(8), Aug. 1979, pp. 5533-5535.
Webster's New Collegiate Dictionary; G. and C. Merriam Co., 1960, pp. 216, 789.

*Primary Examiner*—Kenneth M. Schor
*Attorney, Agent, or Firm*—Richard R. Mybeck

[57] ABSTRACT

A method of achieving long-term stability in the transmission properties of high purity low-hydroxyl vitreous silica optical waveguide fibers having preexisting peroxy linkages disposed therein in which the peroxy linkages are exposed to deuterium molecules and the reaction between the deuterium molecules and the peroxy linkages to form deuteroxyl group is substantially enhanced by simultaneously or sequentially exposing the permeated fibers to a light source having an intensity of at least 10 Lambert Units and a wave length of from the short wave length absorption edge of vitreous silica up to about 650 nanometers until the absorption at 1.7 micrometers reaches saturation.

8 Claims, No Drawings

METHOD OF PROCESSING HIGH PURITY LOW-OH VITREOUS SILICA FIBERS

INTRODUCTION

This application is a continuation-in-part of my prior U.S. patent application Ser. No. 577,270 filed Feb. 6, 1984, now abandoned.

This invention relates to a method of achieving long-term stability in the transmission properties of high purity, low-hydroxyl ("low-OH") vitreous silica optical waveguide fibers. It is important to maintain low-loss characteristics of silica optical fibers over a long period of time in order to realize stable optical transmission lines under a variety of operational conditions such as immersion in water, temperature variations, and other externally applied forces.

BACKGROUND OF THE INVENTION

The use of high-purity, low-OH vitreous silica enables the production of optical waveguide fibers having excellent optical transmission properties, typically about 1 dB/km, in the wavelength region between 1.0–1.7 micrometers (the "transmission window") and in other regions of the far red and near infrared spectrum (See: Hetherington, G. et al., Phys Chem Glass Journal, p. 130, 1969). The main restriction heretofore encountered has arisen from optical absorption bands (See: Keck, D. B., et al., "On the ultimate laser limit of attenuation in glass optical waveguides", Appl. Phys. Letters, vol. 22, No. 7, pp. 307–309, Apr. 1, 1973; Stone, J. et al., "Overtone vibrations of OH groups in fused silica optical fibers, J. Chem Physics, 76, pp. 1712–1722, 1982) caused by hydroxyl (OH). One such absorption band occurs at 1.4 micrometers, that is, in the middle of the above-defined transmission window.

It has been observed that molecular hydrogen ($H_2$) permeates vitreous silica (See: Hartwig, C. "Raman scattering from hydrogen and deuterium dissolved in silica as a function of pressure", J. Applied Phys., Vol. 47, page 956, 1976). Further, it has recently been reported that $H_2$ permeation also occurs in optical fibers made out of low-OH vitreous silica and even fully clad, finished waveguide cables under certain operational conditions. (See: Mochizuki, K. et al., "Transmission loss increase in optical fibers due to hydrogen permeation", Electron. Lett., Vol. 19, No. 18, pp. 743–745, 1983; Fox, M. et al., "Attenuation changes in optical fibers due to hydrogen", Electron. Lett., Vol. 19, No. 22, pp. 916–917, 1983; Beales, K. J., "Increased attenuation in optical fibers caused by diffusion of molecular hydrogen at room temperature", Electron. Lett. Vol. 19, No. 22, pp. 917–919, 1983). The $H_2$ permeation has been found especially prevalent when water is in contact with the fibers and/or the metal parts of the cables (See: Uesugi, N. et al., "Infra-red optical loss increase for silica fiber in cable filled with water", Electron. Lett. Vol. 19, No. 19, pp. 762–763, Sept. 15, 1983.) The presence of molecular hydrogen gives rise to a group of absorption bands between 1.0–1.2 micrometers which deteriorates the transmission properties in this spectral region.

Furthermore, it has been reported that molecular hydrogen ($H_2$) reacts with existing defects in high purity low-OH vitreous silica, (See: Shelby, J. E., "Reaction of hydrogen with hydroxyl-free vitreous silica", J. Appl. Phys., 51 (5), pp. 2589–2593, May 1980; Friebele, E. J. et al., "Fundamental defect centers in glass: the peroxy radical in irradiated high purity fused silica", Phys. Rev. Lett Vol. 42, pp. 1346–1349, 1979) which are introduced during the fabrication process. These existing defects have been identified as peroxy defects, eg, local deviation in the glass structure caused by an extraneous oxygen atom inserted into the common Si—O—Si link changing it into Si—O—O—Si link. This defect will be herein referred to as a "peroxy link". The reaction of molecular $H_2$ with peroxy links leads to the formation of additional OH. Thus, a low OH content material typically having 5 ppm OH, is altered to typically 80 ppm OH, (See Shelby, J. E. supra). The newly formed hydroxyls lead to a substantial increase in the optical attenuation in the spectral region between 1.4–1.65 micrometers and in other regions wherever the OH absorption bands occur. Thus the original intent of producing and maintaining low OH optical waveguide fibers is defeated.

One approach recently described by Hen-Tai Shang et al. (See: Electronics Letters, Vol. 19, No. 3, pp. 95–96, Feb. 3, 1983) comprises effecting an OH→OD exchange process in the substrate tube used for chemically depositing specific layers upon the undrawn fiber rod and eliminate the substrate take as a source of OH-contamination. But this technique does not eliminate the danger that the finished fiber will become permeated with $H_2$ which thereafter slowly reacts with the peroxy linkages contained therein to produce undesired OH.

Shelby et al (See: "Radiation-induced isotope exchange in vitreous silica" J. Appl. Phys., 50 (8), August 1979) have deliberately permeated low OH vitreous silica with deuterium ($D_2$) (See: Hartwig, C. "Raman scattering from hydrogen and deuterium dissolved in silica as a function of pressure", J. Applied Phys., Vol. 47, page 956, 1976) and by the use of gamma or X-radiation or elevated temperature, ie, circa 500° C. reacted the peroxy linkages contained therein with the molecular deuterium ($D_2$) to produce deuteroxyl groups (OD). However, to thermally react the $D_2$ molecules with the peroxy links in the vitreous silica to convert them to OD, a temperature greater than 200° C. has heretofore been required. (See: Uesugi, N. et al. "Stress and temperature effects on optical loss increase for phosphar-doped silica fiber in the long wavelength region", Electron. Letters, Vol. 19, pp. 842, Sept. 29, 1983). Unfortunately such temperatures are usually too high for fibers mantled with organic polymers and for cables fabricated therefrom. Therefore a need exists to develop a technique for maximizing not only the deuterium permeation but also the reaction between $D_2$ and the peroxy linkages which will allow universal application of the technique to vitreous silica optical fibers and cables made therefrom, irrespective of the materials with which such fibers and/or cables are clad.

Accordingly, it is a prime object of the present invention to provide high purity, low-OH vitreous silica which can be utilized to produce optical waveguide fibers which will not develop OH absorption bands within the transmission window of the fibers during normal use as well as in underground and underwater installations.

Another object of the present invention is to provide a new processing technique which creates optical waveguides from high purity low-OH vitreous silica which will not, in response to temperature changes, exposure to humidity and external forces, attenuate in their optical transmission properties because of a slowly increasing OH content.

Still another object of the present invention is to provide optical waveguide fibers from high-purity low-OH vitreous silica which achieve long term optical stability and permit long distance and transoceanic transmission of optical signals with minimal loss of absorption in the transmission window of 1.0 to 1.7 micrometers.

A further object of the present invention is to provide a novel and improved method of permeating vitreous silica with deuterium molecules at reasonable operating temperatures and pressures to create optical fibers, optical waveguides, and cables for optical transmission having long term optical stability within the transmission window.

A still further object of the present invention is to provide high purity low OH vitreous silica optical waveguide fibers which avoid the formation of additional OH over time in use by pretreatment with deuterium gas which permeates the fibers to react with the peroxy linkages therewithin to form an OD having an optical absorption band which lies at the end of the transmission window.

These and still further objects as shall hereinafter appear are achieved by the present invention in a remarkably unexpected fashion as can be readily discerned from a careful consideration of the following detailed description of certain exemplary embodiments thereof.

DETAILED DESCRIPTION

The present invention is predicated upon my discovery of a technique for permeating high purity low-OH vitreous silica with molecular deuterium to react the peroxy linkages contained in the silica to form OD while avoiding the excessive ionizing irradiation and polymer destroying temperatures heretofore required to effectuate the maximum reactivity of deuterium and the ultimate creation of deuteroxyl groups throughout the silica matrix.

As used herein, the term "pre-existing defects" refers essentially to peroxy linkages having the structure $Si-OO+\ldots Si$ wherein the + and the − signs refer to lone electrons which provide an electron spin resonance signal. Current belief is that the precursor of the peroxy radical must be a peroxy bridge between $SiO_4$ tetrahedra, ie, the "defect" $Si-OO-Si$.

The term "long term" as used herein is intended to define the projected lifetime of a technical waveguide cable produced pursuant hereto under expected operating conditions, for instance, the expected life of such a transoceanic transmitter device is of the order of several years, i.e., five or more, as contrasted to a life of one to three years obtained by the prior art processes. During the "long term", the cable must be immune against degradation which results from the slow reaction of the peroxy linkages with hydrogen derived from traces of moisture or even sea water.

The term "high purity" as applied to vitreous silica means silica which contains no aluminum, phosphorus or other recognized impurity.

The term "low OH" as applied to vitreous silica means silica containing 5 ppm or less hydroxyl using standard measuring techniques.

In one practice of the present invention, a bundle of the vitreous silica fibers, or the waveguides and cables containing the vitreous silica fibers encased within a typical organic mantle, are first placed into a sealable container such as a pressure vessel. The bundles are then exposed to the presence of deuterium ($D_2$) gas, either pure or diluted with an inert carrier gas such as nitrogen, argon and the like, at a pressure of from about 1 to about 10 atmospheres and at a temperature close to but no higher than that temperature at which the specific fiber or cable configuration can be treated without degradation or loss of other vital functions. The time period for the treatment is relative to both the preselected pressure and temperature and shall continue for a time which is sufficiently long to enable the deuterium to completely permeate the fiber. Note that many technical fibers are clad with organic mantles which are likely to degrade under high temperatures. Because the length of the deuterium treatment required hereby can be substantially shortened by increasing the temperature at which the permeation is accomplished, the exact temperature selected for a given cable clad with a specified mantle material must be chosen carefully to comply with the specification for such mantle material. In this way, the advantages of the present invention can be obtained without destroying or otherwise harming the mantle material.

As indicated, the time required to complete the process for a given fiber diameter is a function of both the pressure and the temperature and can readily be determined once these other parameters are established for a given treatment. Furthermore, pressures in excess of those indicated above can be employed when proper and safe reaction vessels are available which will further reduce process time. Next, the peroxy linkages in the silica with which the $D_2$ molecules react, are optically activated by bathing the fibers with a light source of at least 10 Lambert Units and having a wavelength which is at least the short wavelength absorption edge of vitreous silica (See: Hetherington, G. et al., supra; Keck, D. B. et al., supra) up to about 650 nanometers. "Nanometer" as used herein is equal to one billionth of a meter (that is, meter$\times 10^{-9}$). Therefore 1 micrometer equals 1000 nanometers. In contrast, the traditional Angstrom unit (Å) is equal to meter$\times 10^{-10}$. While light can be directed at the fibers from any angle to achieve the desired activation, preferred results are obtained when the light is directed onto the fiber ends and along the longitudinal axis thereof so that the light propagates along that longitudinal fiber axis. With either the angular or the axial approach, the light will stimulate the reactivity of the peroxy linkages with $D_2$ and enhance the formation of the OD groups as shown by the increase in absorption at 1.7 micrometers. When the absorption reaches its maximum, referred to as saturation, the light source can be withdrawn.

In the preferred practice of the present invention, a desired amount of deuterium gas will be admitted into the pressure vessel and then valved off. The process hereof does not require streaming deuterium nor the use of an specific deuterium pressure. This is a special advantage because it reduces the consumption of the deuterium, an extremely costly substance.

It has been found that the light activation step can be performed either simultaneously or subsequently to the $D_2$ permeation step with equally suitable results.

When the reactive defects in the initially low-OH vitreous silica are all or substantially all transmuted into OD, the objective of achieving stable optical transmission properties is reached because the OD sites are not noticeably affected by and will not exchange with molecular hydrogen or water under most operational conditions encountered by optical waveguide fibers and cables within the intended lifetime of the installation.

It is of course understood that such modifications, alterations and adaptations as may readily occur to the artisan confronted with this disclosure are intended within the spirit of the present invention which is limited only by the scope of the claims appended hereto.

Accordingly what is claimed is:

1. A method of substantially eliminating peroxy linkages from high purity vitreous silica optical waveguide fibers having such linkages disposed therein to produce a waveguide fiber having enhanced stability in its transmission properties in the wavelength region of 1.0 to 1.7 micrometers, said method comprising exposing said vitreous silica optical waveguide fibers to deuterium molecules for a time sufficient to permeate said fibers with deuterium molecules and thereafter exposing said fibers to a high intensity light source having a wavelength of from the short wavelength absorption edge of vitreous silica up to about 650 nanometers and an intensity of at least 10 Lamberts to activate the peroxy linkages therein and react substantially all of said peroxy linkages with deuterium molecules to create deuteroxyl groups within said fibers and to provide a maximum absorption loss at 1.7 micrometers.

2. A method of substantially eliminating peroxy linkages from high purity vitreous silica optical waveguide fibers having such linkages disposed therein to produce a waveguide fiber having enhanced stability in its transmission properties in the wavelength region of 1.0 to 1.7 micrometers, said method comprising exposing said vitreous silica optical waveguide fibers to deuterium molecules for a time sufficient to permeate said fibers with deuterium molecules and simultaneously exposing said fibers to a high intensity light source having a wavelength of from the short wavelength absorption edge of vitreous silica up to about 650 nanometers and an intensity of at least 10 Lamberts to activate the peroxy linkages therein and react substantially all of said peroxy linkages with deuterium molecules to create deuteroxyl groups within said fibers and to provide a maximum absorption loss at 1.7 micrometers.

3. A method according to claim 1 in which said optical waveguide fibers are bundled and placed into a sealed vessel before exposing said fibers to said deuterium molecules.

4. A method according to claim 3 in which the pressure of the deuterium gas in said vessel is about 1 barometer and the temperature therein is beneath the degradation temperature of specific fiber configuration.

5. A method according to claim 2 in which said optical waveguide fibers are bundled and placed into a sealed vessel before exposing said fibers to said deuterium molecules.

6. A method according to claim 5 in which the pressure of the deuterium gas in said vessel is about 1 barometer and the temperature therein is no higher than that which can be tolerated by the fiber bundle without degradation or deformation.

7. A method according to claim 1 in which said fibers are exposed to said light source along the longitudinal axis of said fibers.

8. A method according to claim 2 in which said fibers are exposed to said light source along the longitudinal axis of said fibers.

* * * * *